(12) United States Patent
Zou et al.

(10) Patent No.: US 8,374,488 B2
(45) Date of Patent: *Feb. 12, 2013

(54) UNIVERSAL MULTIMEDIA OPTIC DISC PLAYER AND ITS APPLICATION FOR REVOCABLE COPY PROTECTION

(75) Inventors: Han Zou, Windsor, NJ (US); Hong Heather Yu, Princeton Junction, NJ (US)

(73) Assignee: Panasonic Corporation, Osaka (JP)

( * ) Notice: Subject to any disclaimer, the term of this patent is extended or adjusted under 35 U.S.C. 154(b) by 883 days.

This patent is subject to a terminal disclaimer.

(21) Appl. No.: 12/420,948

(22) Filed: Apr. 9, 2009

(65) Prior Publication Data

US 2009/0190902 A1    Jul. 30, 2009

Related U.S. Application Data

(60) Continuation of application No. 12/263,745, filed on Nov. 3, 2008, now Pat. No. 8,265,456, which is a continuation of application No. 11/398,064, filed on Apr. 5, 2006, now Pat. No. 7,460,765, which is a division of application No. 09/821,644, filed on Mar. 29, 2001, now Pat. No. 7,058,284.

(51) Int. Cl.
*H04N 5/783* (2006.01)

(52) U.S. Cl. ........................................................ 386/252

(58) Field of Classification Search ........................ None
See application file for complete search history.

(56) References Cited

U.S. PATENT DOCUMENTS

| | | | |
|---|---|---|---|
| 5,748,783 A | 5/1998 | Rhoads | |
| 5,809,139 A | 9/1998 | Girod et al. | |
| 5,848,155 A | 12/1998 | Cox | |
| 5,862,260 A | 1/1999 | Rhoads | |
| 5,893,067 A | 4/1999 | Bender et al. | |
| 5,905,800 A | 5/1999 | Moskowitz et al. | |
| 5,915,027 A | 6/1999 | Cox et al. | |
| 5,920,720 A | 7/1999 | Toutonghi et al. | |
| 5,930,369 A | 7/1999 | Cox et al. | |
| 5,954,805 A | 9/1999 | Brusky et al. | |
| 5,963,909 A | 10/1999 | Warren et al. | |
| 5,974,473 A | 10/1999 | Leavitt et al. | |
| 6,096,095 A * | 8/2000 | Halstead | 717/107 |
| 6,272,674 B1 | 8/2001 | Holiday, Jr. | |
| 6,762,798 B1 * | 7/2004 | Messer et al. | 348/565 |
| 7,058,284 B2 * | 6/2006 | Zou et al. | 386/254 |
| 7,246,180 B1 * | 7/2007 | Yoshida et al. | 710/15 |
| 7,369,752 B2 * | 5/2008 | Zou et al. | 386/248 |
| 7,460,765 B2 * | 12/2008 | Zou et al. | 386/252 |

OTHER PUBLICATIONS

Bender et al., Techniques for Data Hiding, IBM Systems Journal, Feb. 1996, vol. 35, No. 3 & 4 (entire document).
Koch et al. Copyright Protection for Multimedia Data, ACM digital Library, Dec. 1984 (entire document).
Zhao, J., Applying Digital Watermarking Techniques to Online Multimedia Commerce, ACM Digital Library, CISSA 1997, Jun. 1997 (entire document).

* cited by examiner

*Primary Examiner* — Huy T Nguyen

(74) *Attorney, Agent, or Firm* — Harness, Dickey & Pierce, P.L.C.

(57) ABSTRACT

The media player employs an operating system that supports a virtual machine into which auto-run playback programs may be loaded and run. The auto run playback program is stored on the media containing the program content, such as on an optical disc medium. When the medium is inserted in the player, the auto run playback program automatically launches and is thereafter used to access playback the media content. Support for legacy media is provided to allow the player to playback compact discs and DVD discs that were manufactured without the auto run playback program.

15 Claims, 2 Drawing Sheets

UNIVERSAL MULTIMEDIA OPTIC DISC PLAYER AND ITS APPLICATION FOR REVOCABLE COPY PROTECTION

CROSS-REFERENCE TO RELATED APPLICATIONS

This application is a continuation of U.S. patent application Ser. No. 12/263,745 filed on Nov. 3, 2008, which is a continuation of U.S. patent application Ser. No. 11/398,064 filed on Apr. 5, 2006, which is a divisional of U.S. application Ser. No. 09/821,644, filed on Mar. 29, 2001. The entire disclosure of each of the above applications are incorporated herein by reference.

BACKGROUND OF THE INVENTION

The present invention relates generally to media players, such as audio/video and multimedia players. More particularly, the invention relates to a player having unlimited compatibility at the application level employing an operating system with associated virtual machine that provides an environment to host an auto-run playback program obtained from the media placed in the player.

Present-day consumer electronic media players, such as DVD players, CD players, laser disc players, and the like, are designed to work with certain pre-specified types of media. For example, a DVD player may be designed to play both DVD video discs and CD audio discs, both based on industry standard formats. The application programs used to decode and play back these media are hard coded into the operating system and application layer of the player hardware. Thus, these conventional media players do not provide an easy upward migration path.

For example, there is currently much interest in providing consumer electronic products with more flexible, interactive features. For example, the user of a DVD video player might be given the ability to change vantage points, allowing the user to view the movie from a different angle. Adding such an interactive feature would likely entail changes in the application layer of the operating system, requiring the user to purchase a new player with these advanced features. Currently player technology simply does not provide an upward migration path suitable for providing changes of this magnitude.

Having a better upward migration path could greatly facilitate the introduction of new, innovative features within the consumer electronics market. However, such an upgrade path is not limited to adding new features. It would also be quite useful to support more sophisticated copy protection schemes, such as revocable copy protection schemes. Present day media player technology is limited in this regard. Current players are able to implement a form of copy protection using copy protection algorithms that are burned into the operating system and application layer of the player. This affords little flexibility. As new copy protection schemes are developed, it would be desirable to allow existing consumer electronic products to take advantage of these new protection schemes.

SUMMARY OF THE INVENTION

The present invention addresses the above issues through the use of a media player that provides unlimited compatibility at the application level. The player employs an operating system having an associated virtual machine that provides an environment to host an auto-run playback program obtained from the media. In an optical disc player, for example, the auto-run program is stored on the disc itself, and is loaded into and run from within the virtual machine automatically when the disc is placed in the disc drive. The auto-run playback program thus executes under the operating system and provides control instructions to the media player's processor to cause the processor to access media content from the media and supply that content to the player's signal processing circuitry for output to the media presentation device. Using an optical disc player to illustrate the concept, after the disc is inserted into the drive, playback begins with the launch of the auto-run program. The auto-run program consequently interprets the content of its target files as proper audio/video out.

Aside from providing an upward migration path, the invention also gives content providers an independent way to implement control processes within the playback routine. These control processes may include copy protection algorithms, for example. In one embodiment, active agent programs are embedded in the media and the auto-run playback program interacts with these agent programs to alter the way media playback proceeds. The active agent program can thus interact with the auto-run playback program to implement a copy protection scheme.

Unlike conventional copy protection schemes, the active agent program can be uniquely developed to work with the auto-run program, as both are supplied on the same media when the media is installed in the player.

For a more complete understanding of the invention, its objects and advantages, refer to the following description and to the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
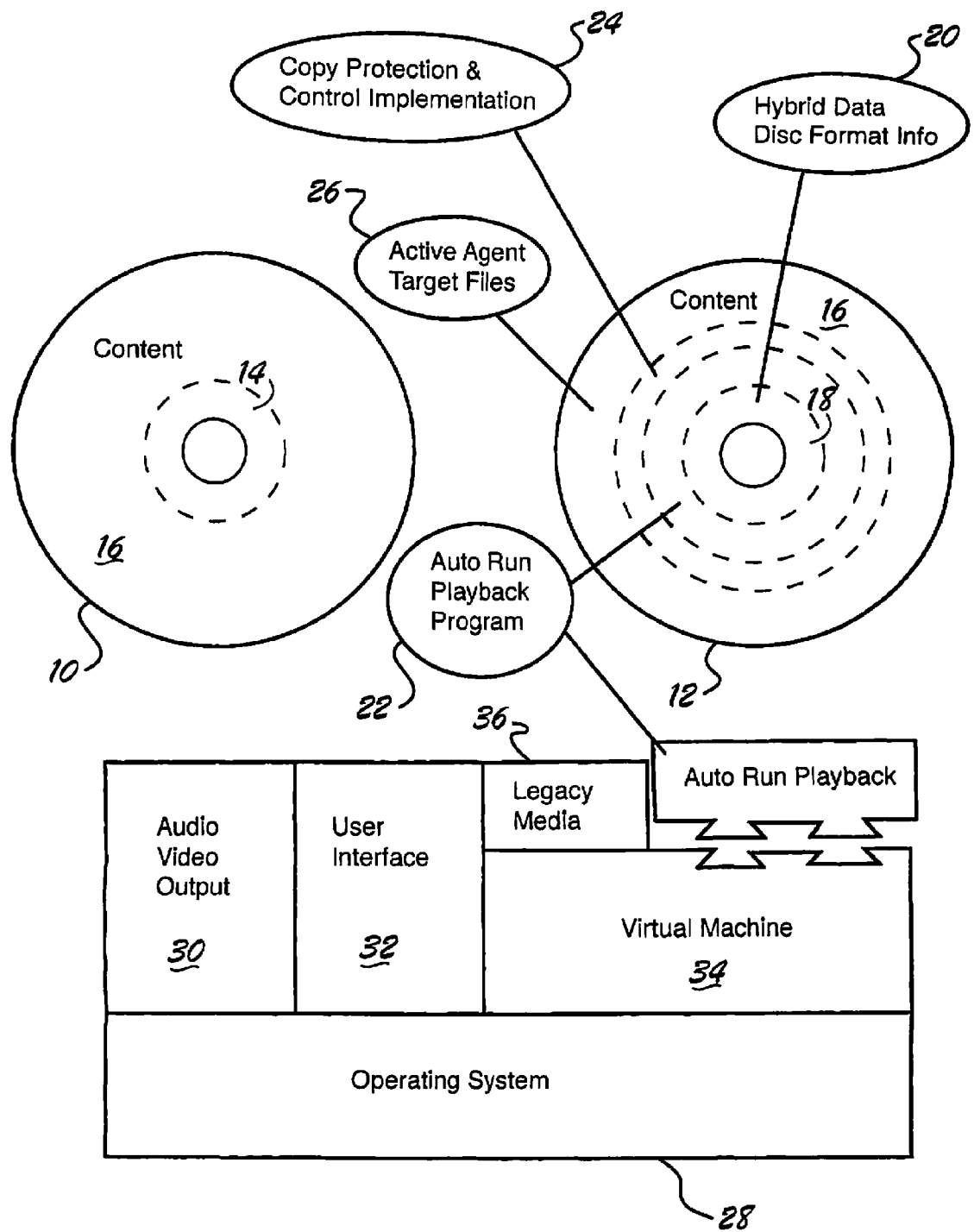
FIG. 1 is a software block diagram of a presently-preferred embodiment of the invention.

Referring to FIG. 1, a software-level description of a presently-preferred embodiment will first be described. The illustrated embodiment features Media 10 and 12, in the form of optical disc media. As will be appreciated from the following description, however, the invention is not limited to optical disc media. Rather, the techniques of the invention can be used with any machine-readable vehicle for delivery of audio/video or multimedia content. Thus, the invention may also be used with flash RAM media and other solid state media, as well as other types of disc and tape media. Moreover, the invention can also be implemented using media delivery vehicles embedded in carrier waves for propagation across computer networks, such as the Internet.

In FIG. 1, Media 10 is intended to illustrate a conventional, "legacy" media, such as a DVD video disc or CD audio disc. Thus, Media 10 has an inner portion 14 containing the disc format information and an outer portion 16 containing the media content. Media 12 is illustrated here to show how the illustrated implementation is able to handle legacy discs that have not been encoded in accordance with the invention.

Media 12 has been encoded according to the principals of the invention. Thus, it includes an inner portion 18 that contains not only the disc format information but also any hybrid information needed by the auto-run playback program in order to boot. In FIG. 1 the hybrid data and disc format information has been diagrammatically represented at 20.

Within the inner portion 18, or elsewhere on the disc, the auto-run playback program 22 is stored. The auto-run playback program loads itself into the memory space of the operating system virtual machine, as will be discussed below. If desired, copy protection and other control implementation data 24 may also be stored on disc 12, along with optional active agent target files 26. These will be discussed more fully below.

The media player employs an operating system 28 which provides basic low level support for hardware devices such as the disc drive into which the disc 12 (or disc 10) is placed. The operating system provides support routines that control the production of audio and video output 30, user interface support 32 and the virtual machine 34. The virtual machine may be implemented using Java technology or other suitable technologies for providing a controlled environment within which to execute the auto-run playback program 22. For example, the virtual machine could be implemented as a program interpreter, in which case the auto-run playback program would represent data to be executed by that interpreter.

The auto-run program is loaded from disc 12 when the disc is first installed in the media player. It then begins execution within virtual machine 34, making use of the audio/video output module 30, user interface module 32 and other services of the underlying operating system 28, as required. The auto-run playback program thus installs itself into the player and then operates upon the media content 16 stored elsewhere on the disc.

To support backward compatibility, in the event an auto-run playback program is not found on the disc (which is the case with disc 10), the virtual machine module 34 includes a legacy media program 36 that then runs within the virtual machine instead of the auto-run playback program. The legacy media program thus provides support for conventional discs, such as conventional DVD discs and CD audio discs.

Figure 2:
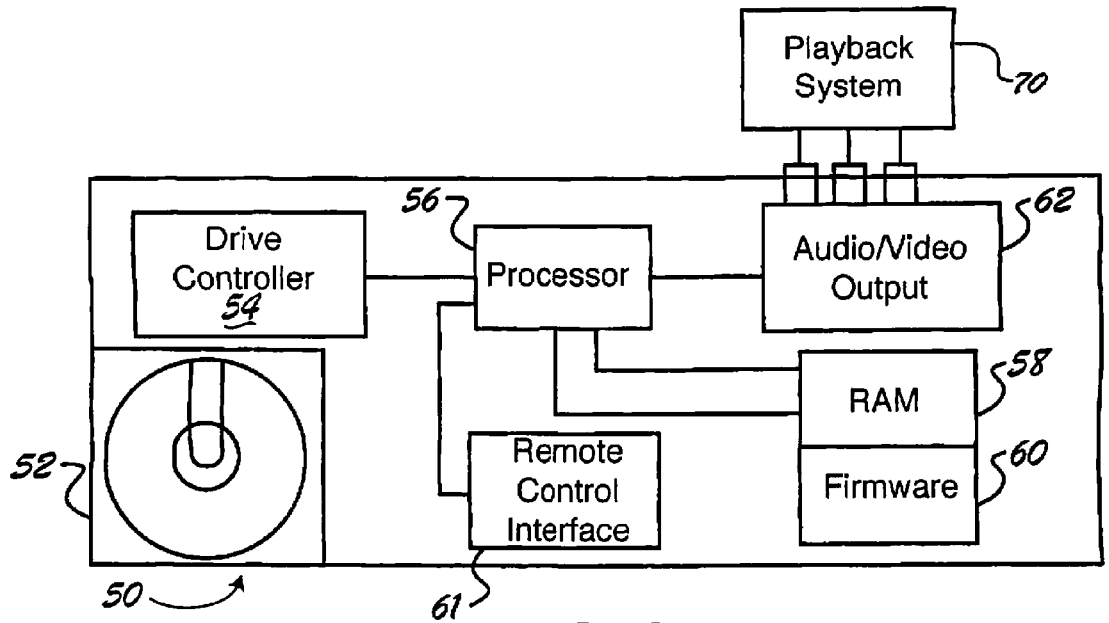
FIG. 2 is a hardware block diagram illustrating the invention in an optical disc player implementation.

One hardware embodiment of a disc player in accordance with the invention is illustrated in FIG. 2 at 50. The player includes a disc drive 52 with associated drive controller 54. A processor 56 has associated RAM memory 58 and operating system memory 60, in the form of ROM or firmware. The remote control interface circuitry 61 and audio/video output circuitry 62 are connected to processor 56. The processor is thus connected to obtain information from a disc inserted in drive 52 and processed that information in accordance with the programs stored the operating system memory or firmware 60, further using the auto-run program after it has been loaded into RAM 58. Media content read from the disc is then output to the audio/video output circuitry 62 for playback on a connected playback system 70.

If desired, disc drive 52 can be, itself, a programmable drive that is capable of assuming different operating configurations based on pre-programmed instructions. Thus, drive 52 may include firmware memory into which configuration settings may be loaded. These settings are then used when the drive performs its data access operations. If desired, the firmware used to configure drive 52 can be implemented as part of the drive controller 54.

Figure 3:
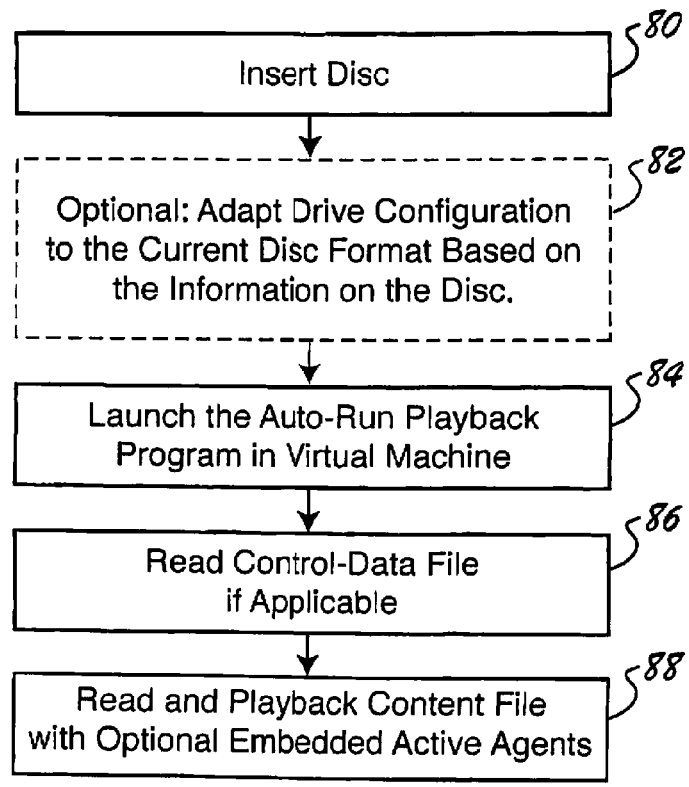
FIG. 3 is a flow chart illustrating the logical process implemented by the invention.

FIG. 3 illustrates how the media player 50 of FIG. 2 is utilized in accordance with the invention. At step 80 a disc is inserted into drive 52. Then, depending on whether the drive is configurable, as discussed above, an optional next step is performed at 82. In this step, the drive configuration is adapted to the current disc format based on format information 20 (FIG. 1) stored on the disc. Then, at step 84, the auto-run playback program is launched in the virtual machine 34 (1). If there is a control data file included as part of the copy protection and control implementation information 24 (FIG. 1), that information is then read at step 86. Finally, the media content 16 (FIG. 1) is read and played back using any optional embedded active agents, as illustrated at 88.

From the foregoing it will be appreciated that the invention may be used to provide a universal optical disc player that can provide unlimited compatibility at the application level. Essentially any application level program can be included as part of the auto-run playback program, creating a virtually unlimited migration path for new consumer electronic products. The invention also advantageously allows content providers to implement their own copy protection strategies on media being distributed. The invention thus frees the player manufacturers and content providers from their interdependence at the application level, while facilitating easy operation for consumers.

Although the illustrated embodiment has taken the form of an optical disc player, the principles of the invention can readily be extended to other types of players. For example, the techniques may be employed in players utilizing flash RAM memory and other solid state memory devices. These solid state memory devices are becoming quite popular in portable consumer audio products and are anticipated to become popular with video products and multimedia products in the future.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A media content player comprising:
    a disc drive operable to read media content, an auto-run playback program and copy protection data from an optical disc;
    a memory having data structure including a virtual machine for hosting the auto-run playback program; and
    a processor operable to (i) execute the auto-run playback program read from the optical disc on the virtual machine, (ii) cause the executed auto-run playback program to interpret the media content by using copy protection data read from the optical disc, and (iii) output the interpreted media content to a playback system for playing back the interpreted media content.

2. The media content player of claim 1, wherein
    said processor installs the auto-run playback program into the media content player, and executes the installed auto-run playback program on the virtual machine.

3. The media content player of claim 1, wherein,
    the optical disc further records an active agent program; and
    said processor executes the auto-run playback program so that the auto-run playback program interacts with the active agent program in order to control playback routine of the media content.

4. The media content player of claim 1, wherein,
said memory further includes a legacy media program for interpreting the media content; and
said processor uses the legacy media program to interpret the media content, when the auto-run program has not been found from the optical disc.

5. A method for a media content player, wherein, the media content player comprises:
a disc drive operable to read media content, an auto-run playback program and copy protection data from an optical disc and
a memory having data structure including a virtual machine for hosting the auto-run playback program, and
the method comprises:
executing the auto-run playback program read from the optical disc on the virtual machine;
causing the executed auto-run playback program to interpret the media content by using copy protection data read from the optical disc; and
outputting the interpreted media content to a playback system for playing back the interpreted media content.

6. A program embodied on a non-transitory computer readable medium for use in a media content player, wherein,
the media content player comprises:
a disc drive operable to read media content, an auto-run playback program and copy protection data from an optical disc; and
a memory having data structure including a virtual machine for hosting the auto-run playback program, and
said program comprises computer-executable code operable to cause the media content player to:
execute the auto-run playback program read from the optical disc on the virtual machine;
cause the executed auto-run playback program to interpret the media content by using copy protection data read from the optical disc; and
output the interpreted media content to a playback system for playing back the interpreted media content.

7. A device for use in a media content player, wherein, the media content player comprises:
a disc drive operable to read media content, an auto-run playback program and copy protection data from an optical disc; and
a memory having data structure including a virtual machine for hosting the auto-run playback program, and
said device comprises a processor operable to cause the media content player to:
execute the auto-run playback program read from the optical disc on the virtual machine;
cause the executed auto-run playback program to interpret the media content by using copy protection data read from the optical disc; and
output the interpreted media content to a playback system for playing back the interpreted media content.

8. The media content player of claim 1, wherein the virtual machine implements a program interpreter that interprets and executes the auto-run playback program supplied as data to said interpreter.

9. The method of claim 5, wherein said virtual machine implements a program interpreter and wherein the method further comprises supplying the auto-run playback program as data to said interpreter and using said interpreter to interpret and execute the auto-run playback program.

10. The program embodied on a non-transitory computer readable medium according to claim 6, wherein said virtual machine implements a program interpreter that interprets and executes the auto-run playback program supplied as data to said interpreter.

11. The device of claim 7, wherein the virtual machine implements a program interpreter that interprets and executes the auto-run playback program supplied as data to said interpreter.

12. The media content player of claim 1, wherein the virtual machine provides a controlled environment within which to execute the auto-run playback program.

13. The method of claim 5, wherein the virtual machine provides a controlled environment within which to execute the auto-run playback program.

14. The program embodied on a non-transitory computer readable medium according to claim 6, wherein the virtual machine provides a controlled environment within which to execute the auto-run playback program.

15. The device of claim 7, wherein the virtual machine provides a controlled environment within which to execute the auto-run playback program.

* * * * *